Dec. 23, 1952 | A. W. TONDREAU | 2,622,475

MULTIPLE FILM PRINTER

Filed Oct. 30, 1950 | 5 Sheets-Sheet 1

INVENTOR.

Albert W. Tondreau

Dec. 23, 1952 A. W. TONDREAU 2,622,475

MULTIPLE FILM PRINTER

Filed Oct. 30, 1950 5 Sheets-Sheet 2

INVENTOR.

Albert W. Tondreau

Dec. 23, 1952 A. W. TONDREAU 2,622,475

MULTIPLE FILM PRINTER

Filed Oct. 30, 1950 5 Sheets-Sheet 3

INVENTOR.

Albert W. Tondreau

INVENTOR.
Albert W. Tondreau

INVENTOR.
Albert W. Tondreau

Patented Dec. 23, 1952 2,622,475

UNITED STATES PATENT OFFICE 2,622,475

MULTIPLE FILM PRINTER

Albert W. Tondreau, Westwood Village, Calif., assignor to Warner Bros. Pictures, Inc., Burbank, Calif., a corporation of Delaware Application October 30, 1950, Serial No. 192,927

12 Claims. (Cl. 88—24)

This invention relates to motion picture film printing apparatus, and particularly to a composite printer, whereby several black and white films or color separation negatives may be efficiently and accurately combined into a final composite negative or positive.

The printing of a plurality of images on different films is known, one type of such printing including the use of mats to combine foreground and background components, as disclosed and claimed in co-pending application, Ser. No. 142,616, filed February 6, 1950. The present invention is directed to the mechanical features of an optical printer, which will accomplish these results, and which will also combine and optically print a color composite from a plurality of black and white separation negatives. The various films to be copied or combined may be advanced at different speeds, and in different directions, to produce certain desired results. It may be used also to produce contact prints when a bi-pack camera is substituted or to produce color separation negatives from a color film. It combines many features, some of which are shown in U. S. Patent No. 2,517,250 of August 1, 1950.

The principal object of the invention, therefore, is to facilitate the printing of several films to a composite film.

Another object of the invention is to provide an improved multiple head optical printer for printing multiple images to a composite image.

A further object of the invention is to provide an improved multiple head printer, each projection head of which may be controlled as to focus, position, and light intensity.

A still further object of the invention is to provide an improved multiple head printer, in which the various films to be combined may be advanced at different speeds and in different directions.

A still further object of the invention is to provide a multiple head printer, whereby a plurality of color separation negatives may be combined into a composite print, and in which the color values of each negative may be controlled.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
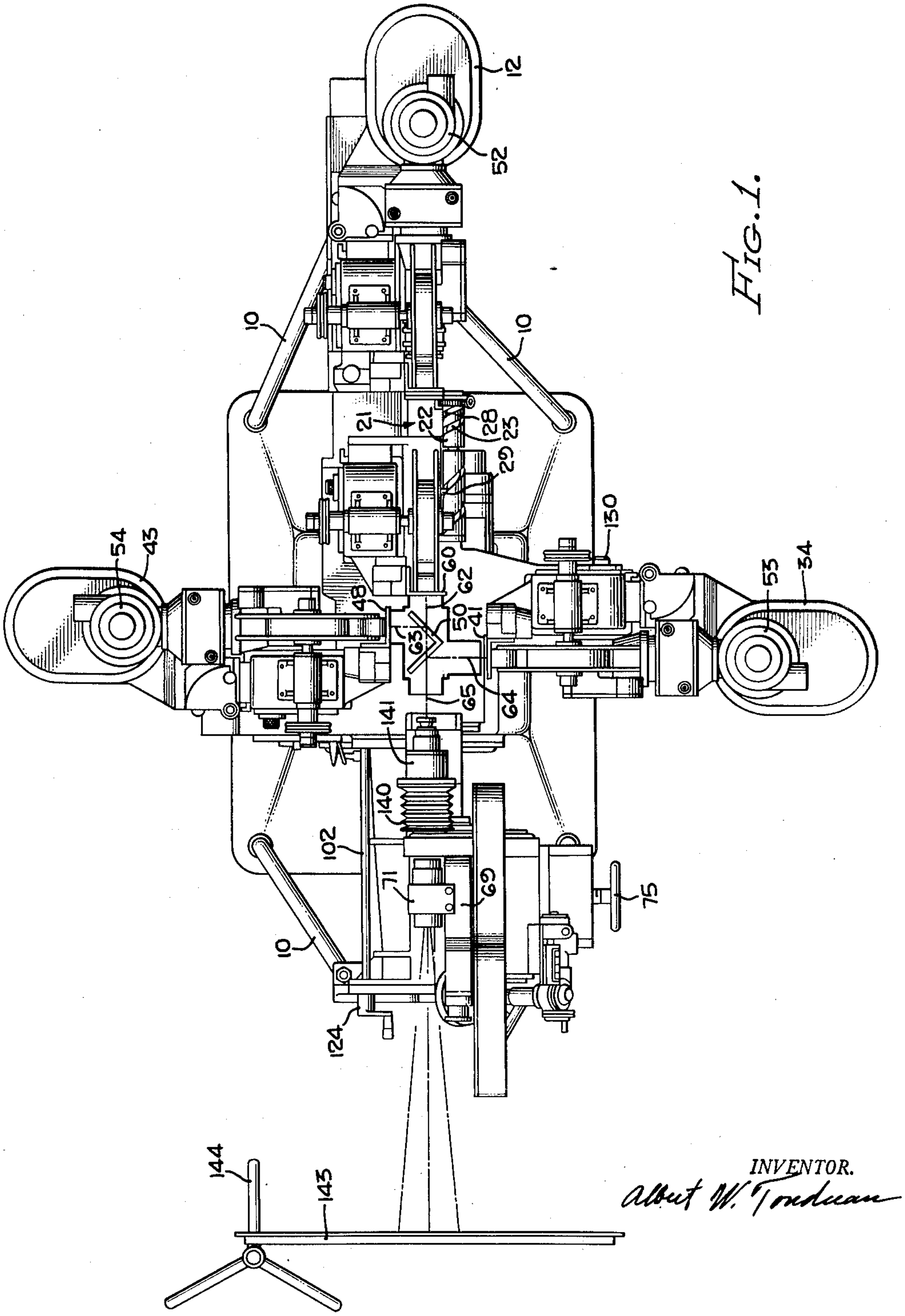
Fig. 1 is a plan view of a printer embodying the invention.

Referring now to the drawings, in which the same numerals identify like elements, a base 5 has mounted thereon a cross frame 6, on which is mounted a slidable bracket 7 and a slidable bracket 8. The frame is supported by four rods 10, the upper ends of which are attached to frame supports 9 and 11.

Mounted on the slidable bracket 7, is a lamp house 12, a lens and filter unit 13, a film drive unit 14 with sprockets 15 and 16, a film projection gate 18, and film reels 19 and 20. Immediately in front of the gate 18 is a "zoom" lens unit 21, adjacent which is a "zoom" lens adjusting cylinder 22 having a variable pitch groove 23 therein.

The unit just described is slidable on the frame 6, the sliding movement being accomplished by the turning of a handle 24. The handle 24 rotates a transverse shaft geared to a horizontal shaft by a pinion 25, which, in turn, drives a shaft 26 which rotates the unit 22. The turning of the crank 24, therefore, slides the entire assembly just described along the frame 6, and, in addition, varies the separation between the lenses within the "zoom" unit 21, in accordance with the distance the unit is moved from the gate 18. As shown in Fig. 1, pins 28 and 29, attached to lens rings within the "zoom" unit 21, extend into the groove 23, and, in view of the variable pitch of the groove 23, the separation between these lenses will be varied in accordance with the position of the film in the gate 18, so that proper magnification of the image on the film with respect to the images on the other films may be obtained.

Also mounted on transverse frame sections 30 and 31 are two units similar to the unit just described. (See Fig. 3.) That is, one unit includes a light house 34, lens and filter casing 35, a film advancing unit 33 with sprockets 36 and 37, film reels 38 and 39, and a film gate 41. The other unit comprises a lamp house 43, a filter and lens casing 44, film advancing unit 45, reels 46 and 47, and a film gate 48. It will be noted in Fig. 1 that the optical path, as shown by the broken lines, for the two transverse units is offset so that the light from one unit impinges on the inner surface of one section of a partial reflector 50, while the light from the other unit is impressed on the outer surface of the other section of the unit 50. It will be noted that the three lamp houses are provided with cooling motor fan units 52, 53, and 54.

Figure 2:
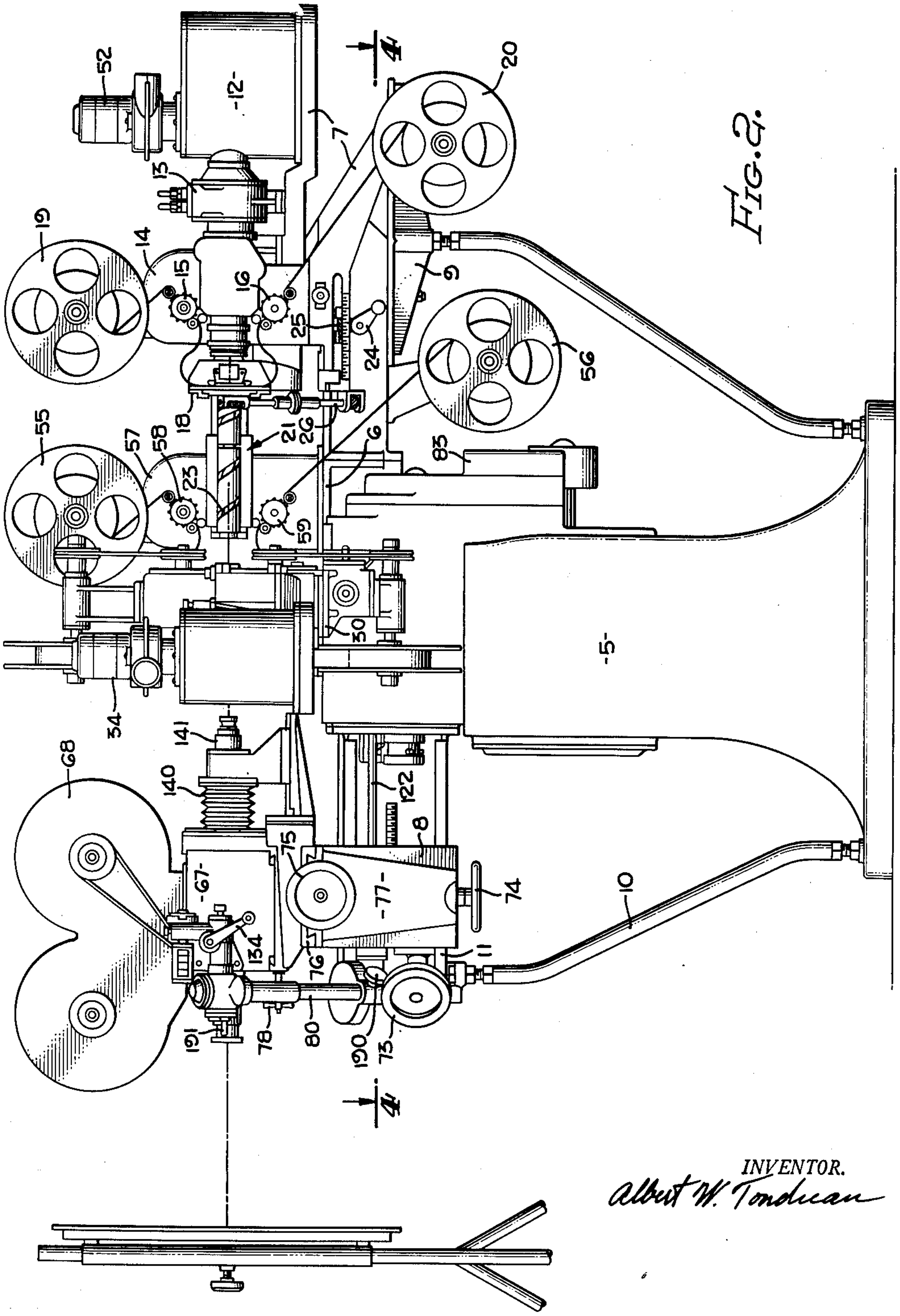
Fig. 2 is a side elevational view of the printer of Fig. 1.

A fourth film advancing unit is also provided, this unit being fixed on the frame 6, and, as shown in Fig. 2, consists of the reels 55 and 56, film driving unit 57 with its sprockets 58 and 59, and its film gate 60. Thus, it is possible to advance four films simultaneously, two of which will follow the optical path shown by the dotted line 62, and the other two of which will follow the optical path shown by the dotted lines 63 and 64, all of which are combined and follow the optical path shown by the dotted line 65, which is coincident with path 62.

Light from the multiple films is projected toward a camera unit 67 having a magazine 68, a view finder 69, and a projecting optical unit 71. The camera unit is adjustable along the optical axis shown by the dotted line 65 by a wheel 73, and is adjusted vertically by a wheel 74 and transversely by a wheel 75. (See Fig. 2.) The transverse adjustment is made by the relative motion of the base 76 with respect to the vertical support 77. The camera is driven by a shaft 80, which is extendible and contractible with adjustments of the camera, the drive end being slidable on the splined main drive shaft. A handle 78 racks the camera to three positions, as will be described hereinafter.

Figure 4:
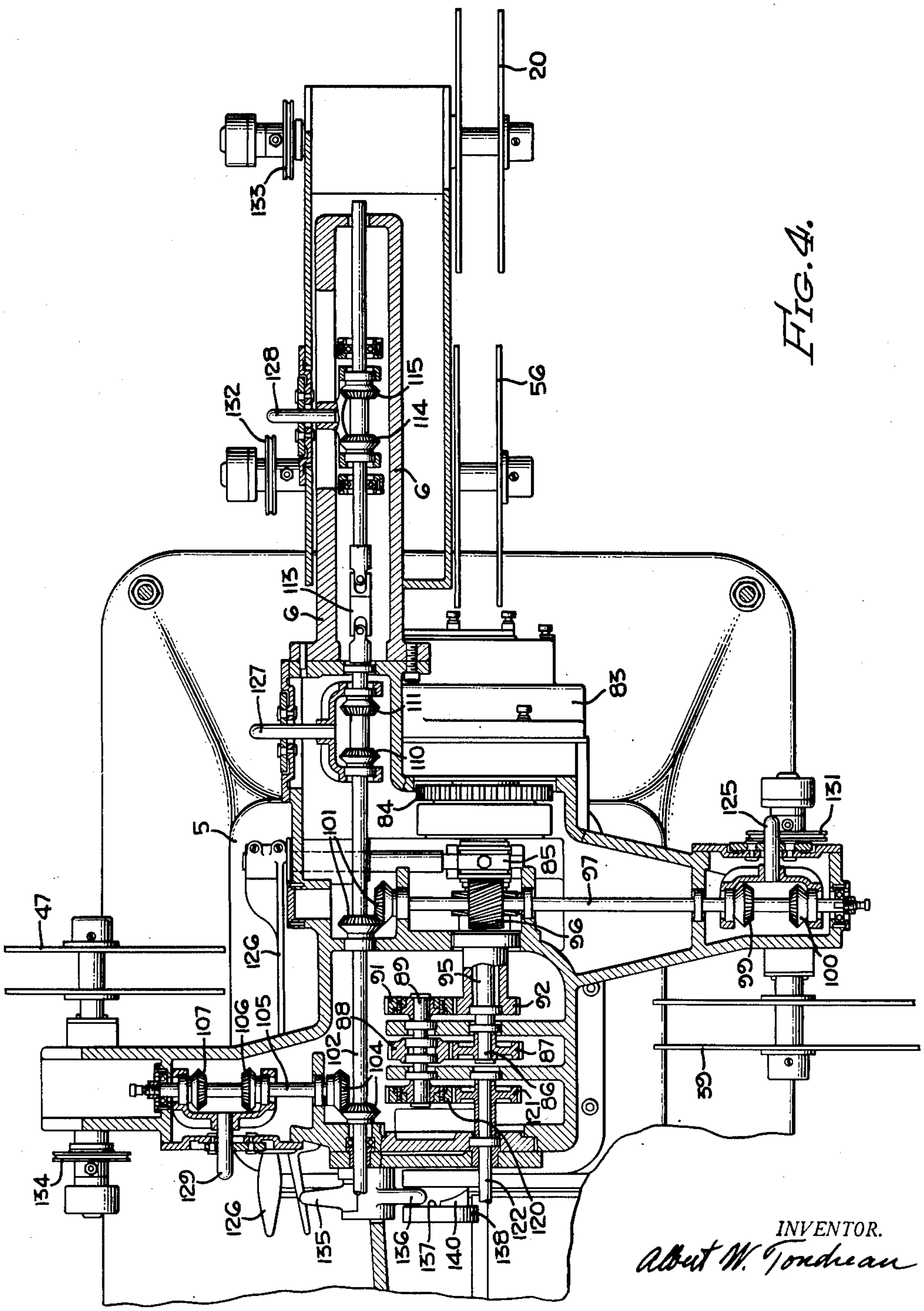
Fig. 4 is a cross-sectional view of the printer taken along the line 4—4 of Fig. 2.

To drive the multiple units, a motor within the base 5 is provided, access to which is obtained by removal of the plate 81. Through a speed reduction gear box 83, the drive gear 84 is rotated, and drives, through a clutch 85, operated by handle 126, a shaft 86, on the end of which is a gear 87. (See Fig. 4.) The gear 87 is in mesh with and drives a gear 88 which rotates a shaft 89, to which is attached a gear 91. The gear 91 rotates a gear 92 mounted on a shaft 95 concentric with shaft 86, which drives another gear meshing with the gear 96. Gear 96 rotates shaft 97, which rotates a pair of gears 99 and 100 of the unit having lamp house 34, and also, through miter gears 101, drives a shaft 102, which drives miter gears 104 for driving shaft 105 for rotating gears 106 and 107. The gears 106 and 107 drive the unit having lamp house 43. The shaft 102 also drives gears 110 and 111, which drives the film advancing unit 57, while, through a coupling 113, gears 114 and 115 are driven for operating the unit having lamp house 12.

On the shaft 89, is also a gear 120 which meshes with a gear 121 and drives a shaft 122, this shaft being connected to the camera drive shaft 80. The shaft 102 extends toward the camera position and has a hand crank 124 thereon for turning the mechanism by hand.

Each of the two pairs of gears, such as 99—100, 106—107, 110—111, and 114—115, are provided to permit reversal of the film drive. This is accomplished by having the vertical shaft driving gear for the film advancing units mounted between the gears of each pair and through movement of the respective handles 125, 127, 128, and 129, either of the pair of gears may be connected with the respective film advancing shaft for advancing the film in either the forward or reverse direction. In addition to the reversal of the film advancing mechanism, they may be driven at either of two speeds by the turning of respective knobs, such as shown at 130, which mesh one of two driven gears with the advancing mechanism to provide either a ratio of one to one or a ratio of two to one. The handle 126 operates clutch 85 to connect the motor to the drive shafts. By means of a handle 134, the camera may be actuated by hand. The film reels are driven by belts in the usual manner over the several pulleys 131, 132, 133, and 134.

To obtain one frame advancement which may be desired to check the density of certain negatives, a lever 135 inserts a dog 136 into the groove 137 of a rotating drive unit 138. The end of the lever 135 will stop the unit 138 when it contacts the projection 140 in the groove 137. The lever 135 may then be tripped to lift the dog 136 to permit one rotation, one rotation being equivalent to the advancement of one frame in the various units.

Referring now to the camera 67 with its bellows 140 and lens unit 141, the camera can be adjusted transversely by handle 78 to three positions. When the camera is moved to the position shown in Fig. 1, the projection unit 71 is aligned with the optical axis shown by the broken line 65, and the light from the various negatives is projected to a viewing or observation screen 143 mounted on a stand 144. By the observation of a large picture on an observation screen in this manner, better registration is permitted of the films in the various projection units, and also, better determination of the color values for each color separation negative is provided.

Figure 3:
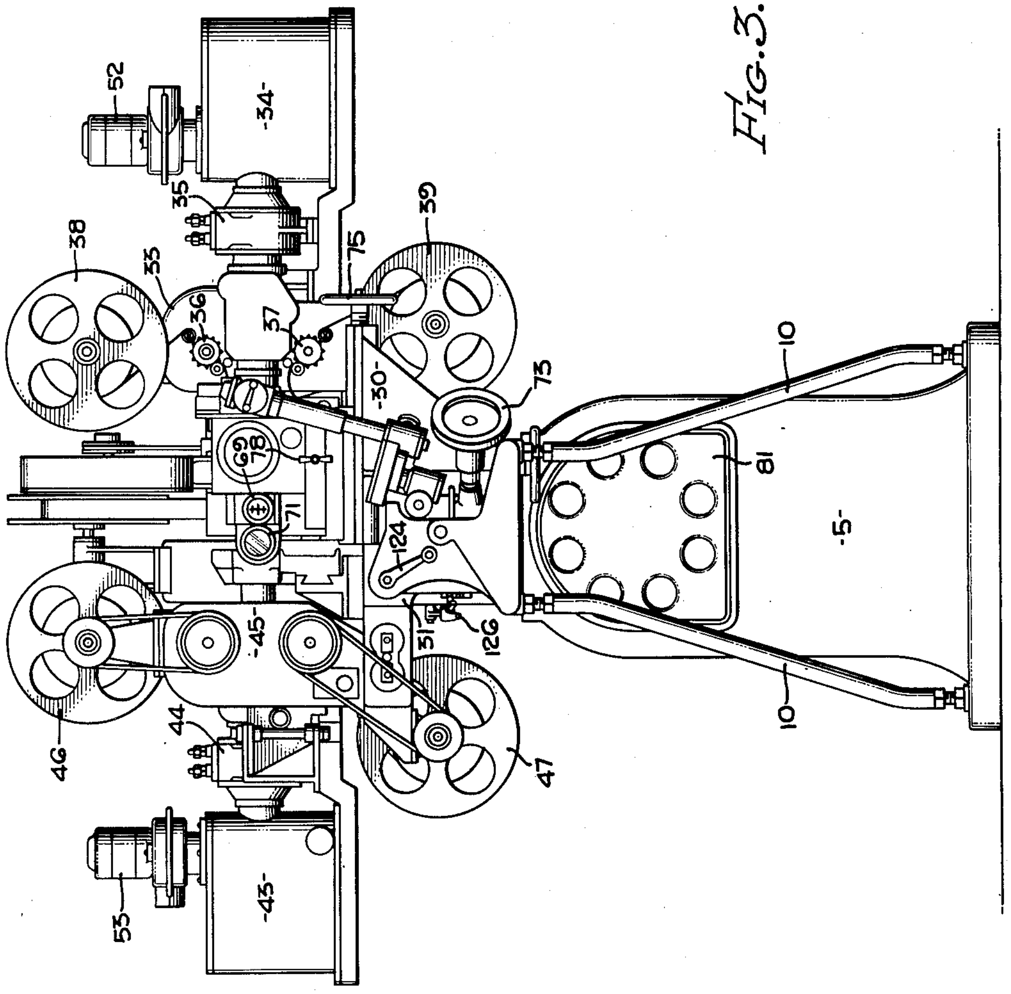
Fig. 3 is an end elevational view of the printer shown in Figs. 1 and 2.

By movement of the camera to the position shown in Fig. 3, the viewer 69 is then aligned with the optical axis shown by the line 65, and the usual observation of the image on the ground glass in the viewer may be made. When it is desired to photograph the image on the film in the magazine 68, the camera is then moved to the third position, whereby the image is projected on the film in the camera.

Figure 5:
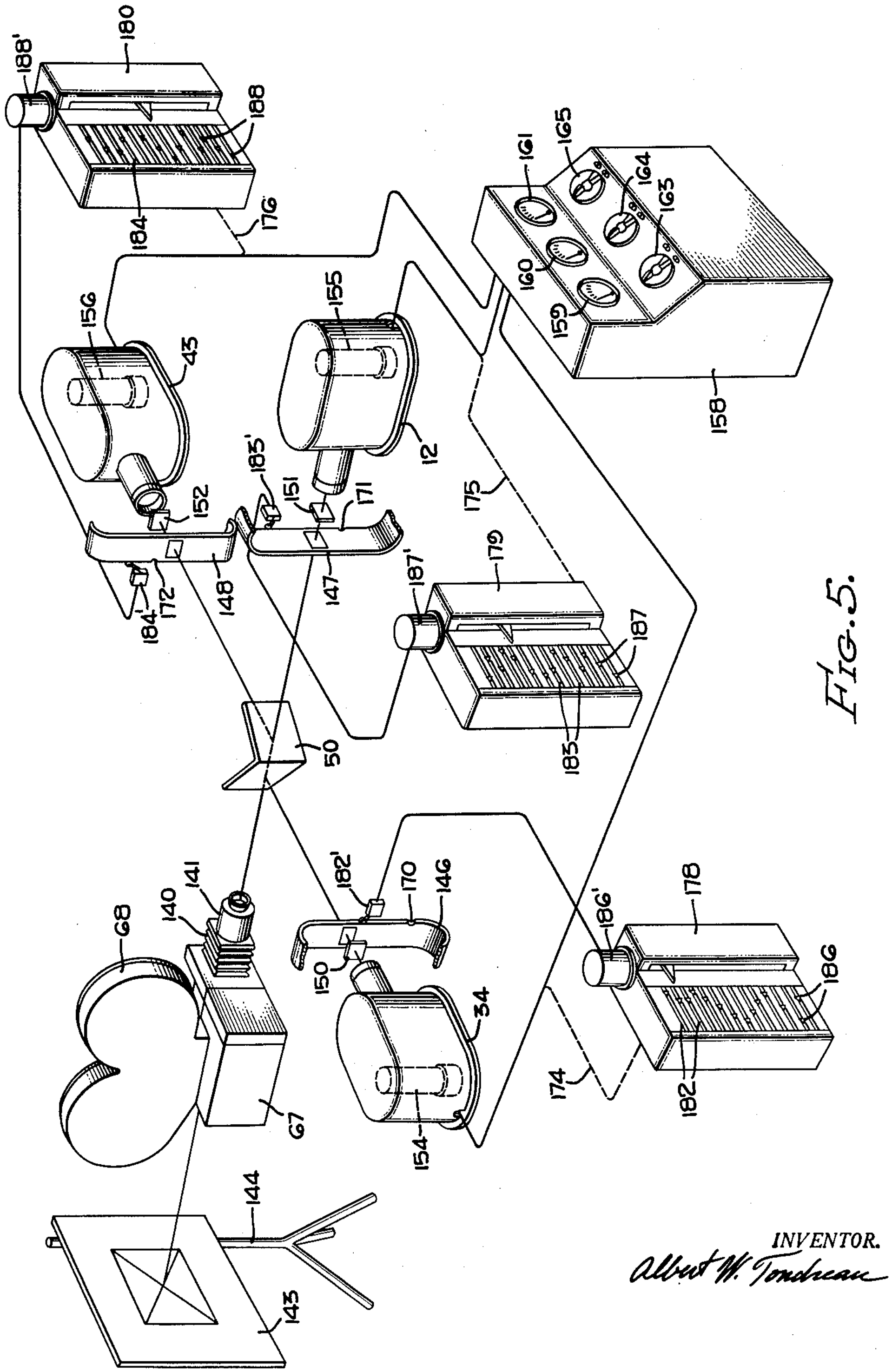
Fig. 5 is a diagrammatic view of the electrical control system for determining the printing intensities for each color separation negative and for other purposes, and showing the automatic operation thereof when the printing intensities have been determined.

Referring now to Fig. 5, three of the units are shown with their lamp houses 34, 12, and 43, and which are set up to combine three color separation negatives 146, 147, and 148. As these negatives are black and white, they are provided with color by the respective filters 150, 151, and 152, which may be red, blue, and green, respectively. To determine the proper color density for each negative to provide the best composite print as viewed on the screen 143, each lamp, as shown by dotted lines 154, and 155, and 156, in their respective lamp houses, is connected to a control console 158 having thereon respective meters 159, 160, and 161, and respective voltage controls 163, 164, and 165. That is, the three separation negatives are threaded in the respective heads with the proper starting points for registration, and each sequence is then viewed to determine what voltage should be supplied to each lamp to provide the best color composite. The entire roll of each separation negative made of various sequences is checked in this manner, and the three negatives are notched as shown at 170, 171, and 172. After the rolls have been thus checked, the lamps are then connected as shown by the dotted lines 174, 175, and 176 to three commercial types of printer light control resistance boxes 178, 179, and 180. These boxes consist of resistance bars as shown at 182, 183, and 184 with respective adjustable sliders 186, 187, and 188, which are adjusted according to the predetermination of the voltage values to be supplied to the respective lamps by the console 158. The impulses from film notch switches 182', 183', and 184' energize respective solenoids 186', 187', and 188', which move the contact connections of the respective lamps to the next resistance bar. Thus, when the separation negatives are rewound to their starting points and the camera adjusted for photographing, the printer may be started and the respective lamp intensities will be controlled by the film notch sections as the separation negatives and the composite raw stock are advanced simultaneously.

The above printer, therefore, will serve many purposes. As just described, it is capable of combining three black and white color separation negatives into a composite print with predetermined color intensities to provide the best over-all print. The checking of the desired intensities is made on a large screen simulating actual projection of the final print. By putting an original colored positive, such as a kodachrome print, in the unit with the lamp house 12, and then using three separate filters and running the positive through the machine with each filter, three black and white color separation negatives may be photographed. This is desirable in many instances, as the black and white negatives do not deteriorate as rapidly as the original color print, and thus, may be stored for future use. This also permits of the revaluation of the color during the recombining of the negatives to make a better print than the original.

The printer may use a bi-pack magazine instead of the magazine 68 on the camera 67 and the front surface of reflector 50 covered with a mirror. In this manner, the unit having lamp house 34 is used for projecting white light, which permits color contact printing. Also, by the use of the "zoom" lens unit 21, one of the negatives may be enlarged with respect to the other negatives, particularly if a background component is used. If it is desired to use a mat in the fixed unit 57, as disclosed and claimed in the co-pending application mentioned above, this may be accomplished. As described, the printer is capable of manual control by advancing the film frame by frame to check the densities of various sequences. After the proper light intensities are determined and the films so marked, the printer operates automatically.

The films in each unit may be reversed to advance the films tail end first, while it may be desired, where backgrounds are used, to run the background at a faster or slower rate than foreground components. Furthermore, the camera is provided with three different speeds to obtain slow motion and other effects, by operation of the gear shifting knob 190, while lever 191 permits the camera to be driven forward or in reverse or to remain stopped.

I claim:

1. A multiple printer comprising a vertical standard, a motor mounted in said standard, a cross frame, a film advancing unit mounted on each of three corners of said frame, a photographing camera mounted on the fourth corner of said frame, a mechanism for sliding said film advancing unit axially aligned with said camera toward and away from said camera, a shaft in said frame parallel with the optical axis of said camera, reversible gear means on said shaft for driving one of said film advancing units in two directions, a pair of shafts in said frame extending at right angles to said first shaft, means for connecting said motor to one of said shafts, reversible gear means on each of said pair of shafts for driving each of said other film advancing units in two directions, a shaft connected to said motor connecting means and parallel with said first shaft, means for connecting said last mentioned shaft to said camera, a variable multiple lens unit positioned between said first mentioned film advancing unit and said camera for varying the size of the image as projected on said camera with respect to the films being advanced by said other film advancing units, and means for both manually and electrically controlling the speed of all of said units.

2. A multiple printer in accordance with claim 1, in which a fourth film advancing unit is provided intermediate said first mentioned film advancing unit and said camera, together with reversible gear means on said first mentioned shaft for driving said fourth film advancing unit.

3. A multiple printer in accordance with claim 2, in which three of said units are provided with fixed film gates, the fourth of said units being provided with a film gate variable axially with said camera, said camera being axially adjustable with respect to said fourth unit.

4. A multiple printer in accordance with claim 1, in which said film advancing units are provided with lamp houses having projection lamps therein, and means operated by a respective film in each of said advancing units are provided for controlling the intensity of the light from a lamp house supplying light to a respective film illuminated thereby.

5. A multiple printer system comprising a standard, a motor in said standard, a frame, a viewing screen, a camera, an optical system for said camera, means for adjusting said camera and optical system longitudinally along the optical axis thereof, a film projector mounted on one end of said frame and having an optical axis parallel with the optical axis of said optical system, means for adjusting on said frame said projector longitudinally along its optical axis, at least one film projector on the side of said frame and having an optical axis substantially normal to said other optical axes, a shaft in said frame for driving said first mentioned projector, said shaft being parallel with the optical axis of said projector, a shaft in said frame perpendicular to said first mentioned shaft and driving said second mentioned projector, means for connecting said motor to said shafts, and a shaft parallel with said first shaft and connected to said last mentioned means for driving said camera, means for reflecting light from said normal optical axis to an axis in alignment with said other optical axes, a viewing unit attached to said camera, a projection unit attached to said camera, means for adjusting said camera, viewing unit, and projection unit transversely of the optical axis of said optical system, one position of said camera, viewing unit, and projection unit impressing on said camera, another position of said camera, viewing unit, and projection unit impressing light on said viewing unit, and a third position of said camera, viewing unit, and projection unit projecting light to said viewing screen, and manual and electrical means for controlling the speed of said projectors and cameras.

6. A multiple printer system in accordance with claim 5, in which reversible gear means are provided on said projector driving shafts for selectively reversing any projector, together with means for selectively varying the speed of one projector with respect to another projector.

7. A multiple printer system in accordance with claim 5, in which means are provided for driving said projectors and camera a predetermined amount at any one time, said amount being the distance between the centers of adjacent film frames.

8. A multiple printer system in accordance with claim 5, in which are provided a third projector having its optical axis in alignment with the optical axis of said first mentioned projector, means for reversibly driving said third projector from said first mentioned shaft, a fourth projector having its optical axis substantially normal to the optical axis of said first mentioned projector, and a third shaft connected to said first shaft for driving said fourth projector.

9. A multiple printer comprising a pedestal, a motor enclosed in said pedestal, a longitudinal frame mounted on said pedestal and having oppositely directed right angle extensions near the center thereof, a camera mounted at one end of said frame for movement along the axis of said frame, a film projector mounted at the other end of said frame for movement along the axis of said frame, a film projector mounted on each of said extensions, a gear and shaft mechanism interconnecting said motor with said camera and projectors for continuously driving said camera and projectors simultaneously, said mechanism including a shaft extending longitudinally of said frame, reversible gear means slidable on said shaft for driving said first mentioned projector in two directions, a shaft extending longitudinally of each of said extensions, reversible gear means slidable on each of said extension shafts for driving the respective projectors on said extensions in two directions, and a shaft parallel with said first shaft for driving said camera, manual means for rotating said shafts for driving said camera and projectors, and means on said manual means for limiting the driving of said camera and projectors the distance of one film frame.

10. A multiple printer in accordance with claim 9, in which are provided a fourth projector positioned on said frame intermediate said camera and first mentioned projector, reversible gear means slidable on said first mentioned shaft for driving said fourth projector in two directions, and a multiple lens unit between said fourth projector and said first mentioned projector.

11. A multiple printer in accordance with claim 9, in which are provided lamps in said projectors, means for varying the light from said lamps to vary each of the images on the film being projected by respective projectors, means for adjusting said light control means, and means for individually controlling each of said light control means by said film being illuminated thereby during the continuous projection of said images to said camera.

12. A multiple film optical printer in accordance with claim 11, in which said light varying means are a plurality of voltage attenuation elements for each of said projectors, and said control means therefor are switches for each of said plurality of elements actuated by said films during the projection of the images thereon.

ALBERT W. TONDREAU.

REFERENCES CITED

The following references are of record in the file of this patent:

UNITED STATES PATENTS

| Number | Name | Date |
|---|---|---|
| 1,898,905 | Seitz | Feb. 21, 1933 |
| 1,913,719 | Nauman | June 13, 1933 |
| 1,959,498 | Planskoy | May 22, 1934 |
| 2,019,748 | Tuttle | Nov. 5, 1935 |
| 2,402,660 | O'Grady | June 25, 1946 |
| 2,491,018 | Thomas | Dec. 13, 1949 |